United States Patent Office 3,384,436
Patented May 21, 1968

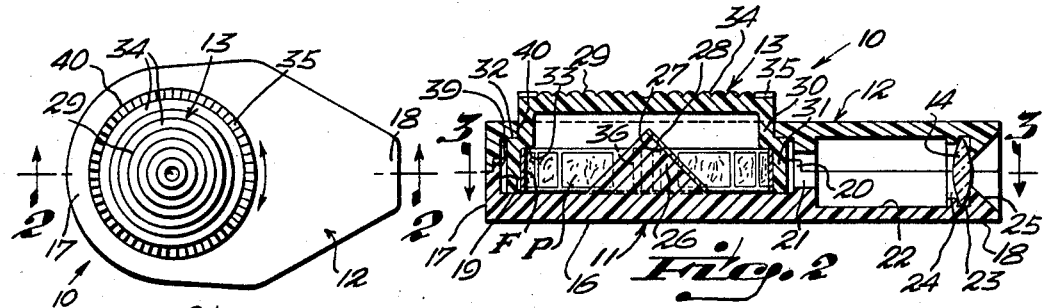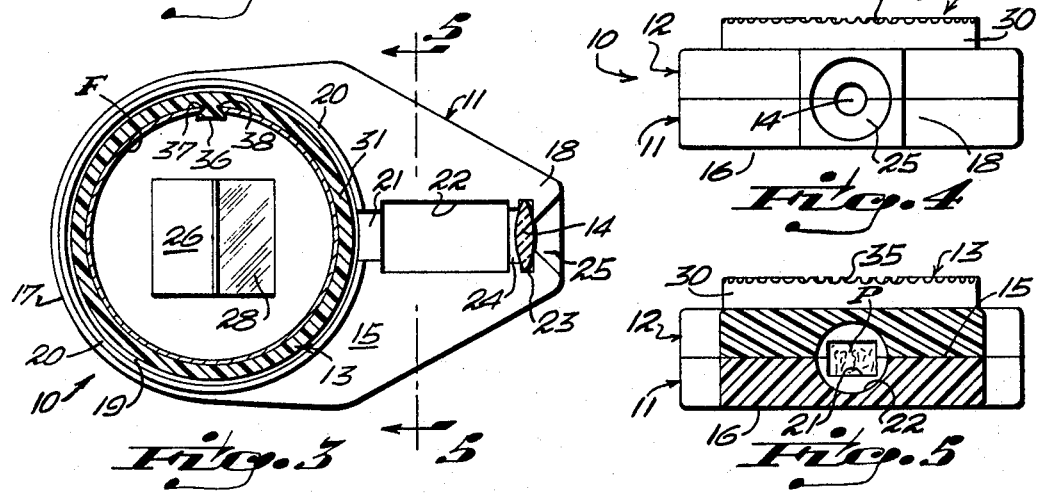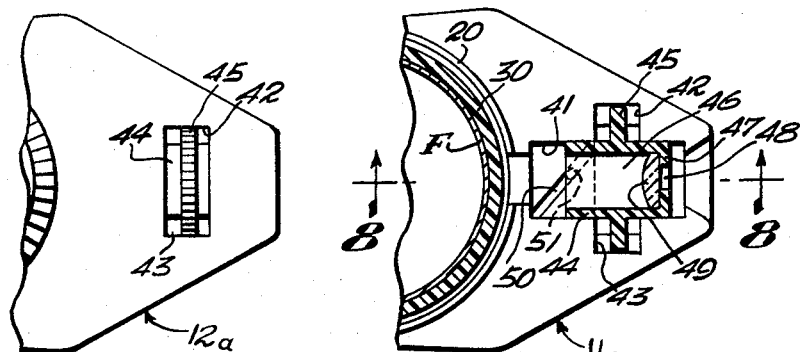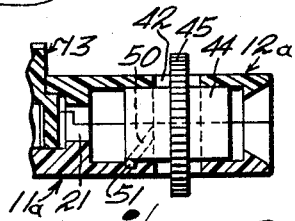
INVENTOR.
ALLEN KUNNEL
BY Ernest H. Schmidt
ATTORNEY.

3,384,436
FILM STRIP VIEWER HAVING LIGHT
CONCENTRATING MEANS
Allen Kunnel, 7941 East Drive,
Miami, Beach, Fla. 33141
Filed Oct. 24, 1963, Ser. No. 318,619
3 Claims. (Cl. 350—238)

ABSTRACT OF THE DISCLOSURE

A hand-supported film strip viewer having an optical opening and adapted to be brought up to the eye for viewing through the optical opening in ambient light, including a cylindrical recess coaxially rotatably disposed within which is a transparent, drum-shaped carrier member supporting a film strip in face-to-face disposition against an inner tubular wall portion of the carrier, individual strip image frames of which are positionable by rotation of the carrier into optical alignment with the optical opening for viewing, selectively, against light passing through and being reflected by the carrier member.

My invention relates to photographic image viewing devices and is directed particularly to an improved hand held and operated device for successively viewing a plurality of photographic images contained in a transparent rotary film carrier.

The principal object of my invention is to provide a film strip viewer of the above nature wherein the film strip is held in fixed relation with respect to the film carrier, thereby keeping the moving parts to an absolute minimum for simplicity of operation and durability.

A more particular object of the invention is to provide a film strip viewer of the character described wherein the film carrier is of drum shape, open at one end and made of a transparent material, the closed end of the carrier serving as a lens operative to gather light for illuminating the film images, and the interior peripheral wall of the carrier serving as a support surface against which the film strip is held in relatively fixed disposition.

Yet another object is to provide a film strip viewer of the above nature which will be compact, ornamental in appearance, fool-proof in operation, economical to manufacture, yet highly suited to its use and purposes and capable of providing sharp, brilliant images.

Other objects, features and advantages of the invention will be apparent from the following description when read with reference to the accompanying drawings.

In the drawings, wherein like reference numerals denote corresponding parts throughout the several views:

FIG. 1 is a top view of a film strip viewer embodying the invention;

FIG. 2 is an enlarged vertical cross-sectional view of the film strip viewer taken along the line 2—2 of FIG. 1 in the direction of the arrows;

FIG. 3 is a horizontal cross-sectional view taken along the line 3—3 of FIG. 2 in the direction of the arrows;

FIG. 4 is an end view of the device as seen from the eye-piece end;

FIG. 5 is a vertical cross-sectional view taken along the line 5—5 of FIG. 3 in the direction of the arrows;

FIG. 6 is a partial top view of a second form of film strip viewer embodying the invention;

FIG. 7 is a partial view similar to FIG. 6, but seen in horizontal cross-section; and FIG. 8 is a partial vertical cross-section of the form of film strip viewer shown in FIGS. 6 and 7, taken along the line 8—8 of FIG. 7 in the direction of the arrows.

Referring now in detail to the drawings, 10 in FIGS. 1 through 5 designates the first form of film strip viewer embodying the invention, the same comprising, generally, a lower body shell member 11, an upper body shell member 12, a film carrier member 13, and an eyepiece lens 14, all of which are preferably molded of synthetic plastic materials, and including a film strip F containing a plurality of images supported within said carrier member, as is hereinbelow more fully described.

The lower body shell member 11 is formed with flat, parallel, inner and outer surfaces 15, 16, respectively, and is rounded at the film carrier end as indicated at 17 and tapered at the eyepiece end, indicated at 18, said shell member being symmetrical about its end-to-end longitudinal axis as is best illustrated in FIG. 3. The inner surface 15 of the lower body shell member 11 is provided with a circular recess 19, which is concentric with the rounded film carrier end 17 of said shell member. An integral annular flange 20 extends upwardly from the peripheral edge of the circular recess 19 for indexing the upper body shell member, as is hereinbelow more fully described.

As best illustrated in FIGS. 2, 3 and 5, the inner wall of the circular recess is formed with a rectangular opening 21 symmetrical with and extending for a short distance along the axis of symmetry of the lower body shell member 11. The inner end of the rectangular recess communicates with a semi-cylindrical recessed portion 22 of greater size than the rectangular opening 21, which in turn communicates with a lens-supporting recess 23 through a semi-cylindrical short recess 24 of reduced diameter, all of which recesses extend along the axis of symmetry of the lower body shell member 11. The outer end of the lens-supporting recess 23 opens into the eyepiece end 18 of the lower body shell member 11 through a divergent lens shade portion 25.

Centrally formed with the circular recess 19 of the lower body shell member is an upstanding boss 26 providing a flat rectangular surface 27 facing the rectangular opening 21 and outwardly inclined at an angle of approximately 45 degrees with respect thereto. The rectangular surface 27 of the boss 26 is provided with a light reflective surface, preferably by applying thereto a piece of front surface reflective adhesive tape, as indicated at 28 in FIGS. 2 and 3.

The film carrier member 13 is generally of drum shape with one end open, and is formed of a transparent material such as "Lucite." The film carrier member 13 has an end wall portion 29 integrally formed with a short, peripheral annular wall portion 30, the outer end of which extends into an annular wall portion 31 of slightly increased diameter to provide outer and inner annular shoulders 32, 33, respectively, at the juncture of said annular wall portions. The end wall portion 29 is formed in its outer surface with a plurality of concentric, smoothly-rounded projections 34, together serving as a light gathering lens for the purpose hereinafter appearing. The outer marginal edge portion of the end wall portion 29 of the film carrier 13 is formed with radial notches 35 providing finger grip means for turning the film carrier, for the purpose hereinbelow more fully described.

Means is provided for holding a film strip in fixed face-to-face relation against the inner surface of the annular wall portion 31 of the film carrier member 13. To this end, there is integrally molded with the inner surface of the annular wall portion 31 a stop member 36, which may be of trapazoidal cross-sectional shape to provide opposed recesses 37, 38 (see FIG. 5) for receiving the ends of a film strip in seating engagement. As illustrated in FIGS. 2 and 3, the film strip F, containing along its length a series of individual pictures P, is just long enough to fit in face-to-face engagement with the inner surface of the annular wall portion 31 with the ends of the strip in seated engagement within the recesses 37, 38. As illustrated in FIG. 2, the inner edge of the film strip F is seated against the inner annular shoulder 33, and the width of said strip is slightly less than the extent of the annular wall portion 31 of the film carrier member 13.

The upper body shell member 12 differs from the lower body shell member 11 described above only in two respects, firstly in that it is formed with an annular recess 39 instead of the annular flange 20 for the purpose of receiving said flange and indexing said shell members for assembly, and secondly, in that it is provided with a circular, through opening 40 through which the peripheral annular wall portion 30 of the film carrier member 13 extends when the viewer is assembled, as is best illustrated in FIG. 2. The opening 40 is of such diameter as will allow free turning movement of the carrier member 13 without permitting enough sideplay for contact between the outer surface of the annular wall portion 31 of the film carrier member 13 with the inner cylindrical wall defined by the carrier recesses in the upper and lower body shell members. Assembly is effected simply by gluing the inner surface portions of the body shell members 11 and 12 together with the film carrier member 13 and the lens 14 in place, said lens being seated and confined in the lens supporting recesses 21 of said shell members, as is best illustrated in FIG. 2.

In use, the viewer 10 is held with the eyepiece end 18 close to one eye and the exposed end wall 29 of the film carrier member 13 directed to the principal source of available light, whether sunlight or artificial light. The concentric, rounded projections 34 in the outer surface of the transparent carrier end wall 29 serve as a condensing lens for intensifying the brilliance of light falling on the reflective element 28 and hence the brilliance of the light impinging upon the inner surface of the back of the film strip F in the vicinity of the picture frame opening defined by the rectangular film frame opening 21 in the upper and lower body shell members 11, 12. The individual film strip picture transparancies, P, preferably in color, and of approximately the same size as the opening defined by the two opposed rectangular openings 21 of the body shell members 11, 12, will then be successively viewed through the eyepiece lens 14 as the film carrier member 13 is intermittently turned from picture to picture, the radial notches 35 in said film carrier serving as finger grip means for such turning. The distance between the film picture (the image) and the eyepiece lens 14, and the size of the lens aperture in front of the lens, are such as to provide a depth of field sufficient to effect a sharp focus with good picture brilliance and without the necessity of maintaining close dimensional toleranecs of the interfiitting parts.

The embodiment of the invention illustrated in FIGS. 6, 7 and 8 differs from the embodiment of FIGS. 1 through 5 described above only in that mechanism is provided for manually adjusting or focusing the eyepiece lens. To this end, as illustrated in FIG. 7, the lower body shell member 11a is formed with a cylindrical recess 41 communicating at one end with the picture frame opening and at the other end with the eyepiece end. About midway along its length, the cylindrical recess 41 opens into a short cylindrically-enlarged portion defining openings 42 and 43 at each side which extend through the outer surface of the lower body shell member 11a. Axially movable within the cylindrical recess 41 is a tubular lens barrel 44 formed about midway along its length with an outer annular flange portion of increased diameter 45 providing grip means for axial adjustment of said barrel, as hereinbelow more fully described. The lens barrel 44 has a bore 46 which extends to an outer end wall portion 47 having a concentric, circular opening or aperture 48. Press-fitted within the lens barrel 44 and seated against the annular shoulder provided by the end wall 47 is the planar surface of a plano-convex eyepiece lens 49. As illustrated in FIGS. 7 and 8, the outer surface of the lens barrel 44 near its inner end and is provided with a pin 51 received in a spiral groove 50 formed in the cylindrical recess 41. The spiral groove 50 is formed in the lower body shell member 11a only, not being required in the upper body shell member 12a when assemblied thereto. Otherwise, the eyepiece end of the upper body shell member 12b is formed as the counterpart of the lower body shell member 11a described above with reference to FIGS. 7 and 8.

In use, the film strip viewer embodiment illustrated in FIGS. 6, 7 and 8 differs from that described above in connection with the embodiment illustrated in FIGS. 1 through 5 only in that rotary movement of the outwardly-projecting portions of the flange grip 45 permits back and forth adjustment of the lens barrel 45 with its lens 49, thereby offering better accommodation to wide variations in viewers' eyesight in focusing, and at the same time, permitting a greater size of aperture opening for increased image brilliance.

In the embodiment of the invention illustrated in FIGS. 6, 7 and 8, there is also the advantage that the aberration characteristic of the plano-convex lens has a tendency to correct any distortions resulting from the somewhat curved form of the image plane caused by the circular disposition of the film strip F within the film carrier member 13.

While I have illustrated and described herein only two forms in which the invention can conveniently be embodied in practice, it is to be understood that these forms are given by way of example only and not in a limting sense. For example, instead of using a film carrier that is a captive part of the viewer for viewing only the series of pictures contained therein, the device could be altered to permit removal thereof for selective substitution of other film carriers containing other pictures, thereby extending the usefulness of the device where desirable to meet the particular needs of other applications. The invention, in brief, is limited only by the scope and spirit of the following claims.

What I claim as new and desire to secure by Letters Patent is:

1. In a hand supported film strip viewer, the combination comprising a body member, a cylindrical carrier member having a circular end wall portion and a tubular transparent peripheral wall portion, a cylindrical recess in said body member, said carrier member being coaxially rotatably received in said recess, said recess being defined in part by an interior arcuate wall section in said body member, a picture frame opening in said arcuate wall section, a film strip carrying along its length a plurality of picture images and disposed in face-to-face relation with respect to the inner surface of said peripheral wall portion of said carrier member, an eyepiece opening in said body member, an elongated chamber in said body member communicating between said eyepiece opening and said picture frame opening, an eyepiece lens within said chamber and near said eyepiece opening for focusing on an image framed by said picture frame opening through said eyepiece opening, and means for directing light through said transparent peripheral wall portion of said carrier member and upon said film strip for illuminating from behind a picture on said film strip framed by said picture frame opening said carrier member being integrally formed of a transparent material and said circular end wall portion extending outwardly of said body member recess, and wherein said light directing means comprises a reflective surface directing light passing through said carrier end wall portion toward said picture frame opening.

2. In a hand supported film strip viewer, the combination comprising, a body member, a circular recess in said body member defining a cylindrical interior wall, a drum-shaped carrier member rotatably disposed in said body member recess, said drum-shaped member having a closed end projecting outwardly of said circular recess and a tubular peripheral wall portion and being integrally formed of a transparent material, a picture frame opening in said body member opening into the cylindrical interior wall of said body member recess, an optical chamber in said body member communicating at one end with said picture frame opening, an eyepiece aperture in said body member communicating with the other end of said optical chamber, an eyepiece lens in said optical chamber, a film strip carrying along its length a plurality of picture transparencies and fixed in face-to-face relation against the inner cylindrical surface of said tubular peripheral wall portion and said drum-shaped carrier and means for concentrating light passing through said closed end of said carrier and means for directing said concentrated light member on a film strip image in register with said picture frame opening.

3. A film strip viewer as defined in claim 2 wherein said body member comprises a pair of thin, flat upper and lower body shell members secured in face-to-face relation and having means including a peripheral shoulder formed on the outside of said tubular peripheral wall portion and a circular opening in said upper body shall member defining a peripheral marginal wall portion seatable over said shoulder for constraining said carrier member to rotational motion in said body member recess.

References Cited
UNITED STATES PATENTS

| | | | |
|---|---|---|---|
| 520,030 | 5/1894 | Blackmore | 325—101 |
| 2,380,088 | 7/1945 | Tickell | 350—141 |
| 2,845,844 | 8/1958 | Vierling | 350—141 |
| 3,057,249 | 10/1962 | Miles | 88—1.5 |
| 3,203,306 | 8/1965 | Lefferts | 350—211 |

JEWELL H. PEDERSEN, *Primary Examiner.*

O. B. CHEW, *Assistant Examiner.*